(12) United States Patent
Doering

(10) Patent No.: US 9,831,775 B2
(45) Date of Patent: Nov. 28, 2017

(54) BUCK CONVERTER

(71) Applicant: International Business Machines Corporation, Armonk, NY (US)

(72) Inventor: Andreas Christian Doering, Zufikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/053,147

(22) Filed: Feb. 25, 2016

(65) Prior Publication Data

US 2017/0250603 A1 Aug. 31, 2017

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ................................ H02M 3/158; H02M 1/08
See application file for complete search history.

(56) References Cited

U.S. PATENT DOCUMENTS

| | | | |
|---|---|---|---|
| 8,988,054 B2 | 3/2015 | Marty | |
| 9,414,461 B2* | 8/2016 | Park | H05B 33/0896 |
| 2005/0265055 A1* | 12/2005 | Chang | H02M 3/158 |
| | | | 363/89 |
| 2007/0075769 A1* | 4/2007 | Blon | H03F 3/45183 |
| | | | 330/86 |
| 2008/0048499 A1* | 2/2008 | Litovsky | H02J 7/345 |
| | | | 307/45 |
| 2011/0285369 A1* | 11/2011 | Cuk | H02M 3/158 |
| | | | 323/282 |
| 2012/0243279 A1 | 9/2012 | Zacharias et al. | |
| 2013/0043854 A1* | 2/2013 | Tran | H02M 3/155 |
| | | | 323/284 |
| 2013/0119966 A1* | 5/2013 | Touzani | B60L 11/005 |
| | | | 323/312 |
| 2013/0241289 A1* | 9/2013 | Ogawa | H02J 1/00 |
| | | | 307/52 |
| 2014/0009131 A1* | 1/2014 | Shilimkar | H02M 3/158 |
| | | | 323/271 |
| 2015/0236601 A1 | 8/2015 | Seok | |

(Continued)

*Primary Examiner* — Fred E Finch, III
*Assistant Examiner* — Demetries A Gibson
(74) *Attorney, Agent, or Firm* — Scully, Scott, Murphy & Presser, P.C.; Daniel P. Morris, Esq.

(57) ABSTRACT

A buck converter for converting an input voltage into an output voltage including a first switch and a low-pass filter circuit comprising an inductor, a low-pass filter switching device and an output capacitor system. The output capacitor system comprises a parallel arrangement of a first path comprising a first capacitor and at least a second path comprising a serial connection of a second capacitor and a second switch. A controller is provided to turn on the first switch during an on-cycle, thereby switching the input voltage to the low-pass filter circuit, and to turn off the first switch during an off-cycle. The controller further turns off the second switch under normal load operations so that the second capacitor is not charged and turns on the second switch in case of a load reduction during the off-cycle so that the second capacitor is added to the output capacitor system by the second switch.

17 Claims, 5 Drawing Sheets

(56) References Cited

U.S. PATENT DOCUMENTS

| | | | |
|---|---|---|---|
| 2015/0318786 A1* | 11/2015 | Houston | H02M 1/15 |
| | | | 323/271 |
| 2016/0056712 A1* | 2/2016 | Chen | H02M 3/158 |
| | | | 323/271 |
| 2016/0336856 A1* | 11/2016 | Jin | H02M 3/158 |
| 2016/0374163 A1* | 12/2016 | Jiang | H05B 33/0842 |
| 2017/0012532 A1* | 1/2017 | Tago | H02M 3/158 |

* cited by examiner

BUCK CONVERTER

BACKGROUND OF THE INVENTION

The present invention relates to a buck converter for converting an input voltage into an output voltage. The invention further relates to a corresponding system, a corresponding method and a corresponding design structure.

Buck converters are used as point-of-load voltage converts to supply microprocessors, FPGAs and similar devices with a low voltage at high currents.

The stability of the converted voltage is important for reliable device operation. In particular there are limits for the supply voltage of modern microprocessors which are only very little higher than the recommended operation voltage. Therefore it is important to guarantee that the buck converter does not exceed these supply voltage limits.

When the load current suddenly changes, the buck converter has to react by regulating its output voltage. In particular, a sudden strong reduction in load current could result in a strong increase of the supply voltage.

Modern microprocessors running at very high frequency can reduce their current consumption very rapidly from full load to nearly no load, for instance by entering a standby mode.

In known buck converter designs the output capacitor is chosen to be large enough to absorb the entire energy stored in the inductor without exceeding the maximum supply voltage of the load device. This results in higher requirements for the output capacitor than the steady-state operation which effects design size.

BRIEF SUMMARY OF THE INVENTION

According to a first aspect, the present invention is embodied as buck converter for converting an input voltage into an output voltage. The buck converter comprises a first switch and a low-pass filter circuit comprising an inductor, a low-pass filter switching device and an output capacitor system. The output capacitor system comprises a parallel arrangement of a first path and at least a second path. The first path comprises a first capacitor and the second path comprises a serial connection of a second capacitor and a second switch. Furthermore the buck converter comprises a controller for controlling the buck converter. The controller is configured to turn on the first switch during an on-cycle, thereby switching the input voltage to the low-pass filter circuit, and to turn off the first switch during an off-cycle. The controller is further configured to turn off the second switch under normal load operations so that the second capacitor is not charged and to turn on the second switch in case of a load reduction during the off-cycle so that the second capacitor is added to the output capacitor system by the second switch. This enables a load sharing of a charge in the first capacitor and a parallel absorption of an inductor current by the first and the second capacitor.

According to another aspect, the invention is embodied as a system comprising a converter according to the first aspect and a computerized device. According to this aspect the converter is configured to provide the output voltage to the computerized device and the computerized device is configured to inform the controller about an expected load drop such that the controller can turn on the second switch.

According to another aspect, the invention can be embodied as a method for handling load reductions in a buck converter. The buck converter is configured to convert an input voltage into an output voltage and comprises a first switch and a low-pass filter circuit. The low-pass filter circuit comprises an inductor, a low-pass filter switching device and an output capacitor system. The output capacitor system comprises a parallel arrangement of a first path and at least a second path. The first path comprises a first capacitor and the second path comprises a serial connection of a second capacitor and a second switch. The buck converter comprises a controller for controlling the buck converter. The method comprises turning on the first switch during an on-cycle, thereby switching the input voltage to the low-pass filter circuit, and turning off the first switch during an off-cycle. The method further comprises turning off the second switch under normal load operations so that the second capacitor is not charged and turning on the second switch in case of a load reduction during the off-cycle so that the second capacitor is added to the output capacitor system, thereby enabling a load sharing of a charge in the first capacitor and a parallel absorption of an inductor current by the first and the second capacitor.

According to yet another aspect, the invention can be embodied as a design structure tangibly embodied in a machine readable medium for designing, manufacturing, or testing an integrated circuit. The design structure comprises a buck converter according to the first aspect.

Devices and methods embodying the present invention will now be described, by way of non-limiting examples, and in reference to the accompanying drawings. Technical features depicted in the drawings are not necessarily to scale. Also some parts may be depicted as being not in contact to ease the understanding of the drawings, whereas they may very well be meant to be in contact, in operation.

DETAILED DESCRIPTION OF THE INVENTION

In reference to FIGS. 1-6, some general aspects and terms of embodiments of the invention are described.

According to embodiments of the invention it is proposed to provide an output capacitor system that splits the output capacitor of a buck converter into a first and at least a second capacitor. The second capacitor is coupled via a switch and can be added to the output capacitor system via the switch. Under normal load operations the second capacitor is not charged and it is only activated on a load reduction during the off-cycle. In the moment of a load reduction the second capacitor is added to the output capacitor system by the switch. In this moment a load sharing of the charge in the first capacitor takes place and both the first and the second capacitor absorb the inductor current. As the second capacitor is not charged in the moment of a load reduction, it can absorb much more energy at the same capacitance. A load reduction corresponds to a lower output current and a higher load resistance.

According to an embodiment normal load operations may be defined as all load operations except for load reductions during the off-cycle. According to a further embodiment normal load operations may be defined as all load operations except for load reductions during the off-cycle by more than 50%. According to a further embodiment normal load operations may be defined as all load operations that result in an output voltage $V_o$ of the buck converter that is within a predefined output voltage range. According to a further embodiment normal load operations may be defined as all load operations according to which the buck converter does not exceed a specified supply voltage limit.

Figure 1:
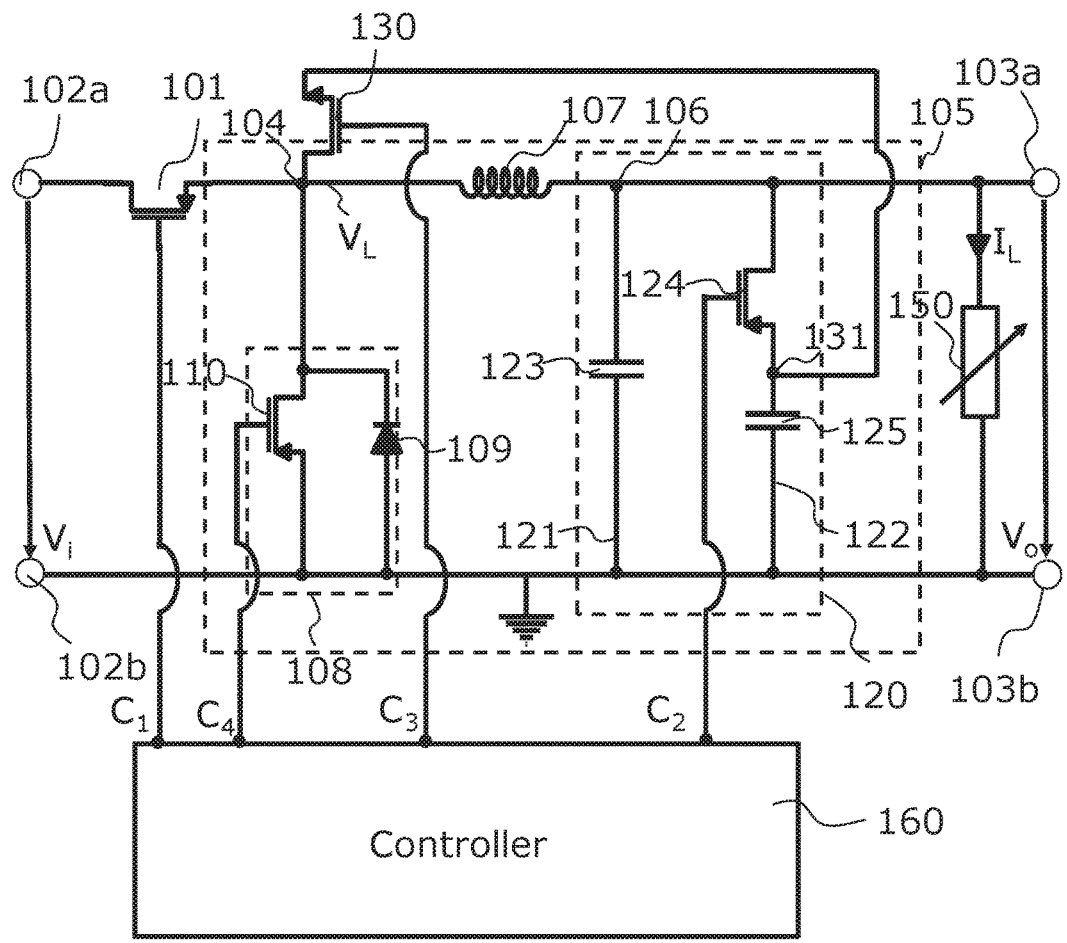
FIG. 1 shows a schematic diagram of an exemplary embodiment of a buck converter.

FIG. 1 shows a schematic diagram of an exemplary embodiment of a buck converter 100. The buck converter 100 is provided for converting an input voltage $V_i$ into an output voltage $V_o$. The input voltage $V_i$ is provided between a first input voltage node 102a and a second input voltage node 102b. The output voltage $V_o$ is provided between a first output voltage node 103a and a second output voltage node 103b. The second input voltage node 102b and the second output voltage node 103b are coupled to ground potential. The buck converter 100 comprises a first switch 101. The first switch 101 is embodied as transistor, more particularly as n-MOSFET. The first switch 101 couples the first input voltage node 102a to a low-pass filter circuit input node 104 of a low-pass filter circuit 105. The low-pass filter circuit 105 comprises an inductor 107 that is coupled between the low-pass filter circuit input node 104 and a low-pass filter circuit output node 106. The low-pass filter circuit output node 106 is coupled to the first output voltage node 103a. The low-pass filter circuit 105 comprises furthermore a low-pass filter switching device 108. The low-pass filter switching device 108 is coupled between the low-pass filter circuit input node 104 and ground. The low-pass filter switching device 108 comprises a parallel arrangement of a diode 109 and a low-pass filter switch 110. According to other embodiments the low-pass filter switching device 108 may comprise only the diode 108 or only the low-pass filter switch 110. The low-pass filter switch 110 is embodied as transistor, more particularly as n-MOSFET.

The low-pass filter circuit 105 comprises an output capacitor system 120. The output capacitor system 120 comprises a parallel arrangement of a first path 121 and at least a second path 122. The first path 121 and the second path 122 are each coupled between the low-pass filter circuit output node 106 and ground. The first path 121 comprises a first capacitor 123 and the second path 122 comprises a serial connection of a second switch 124 and a second capacitor 125. The second switch 124 is coupled to the low-pass filter circuit output node 106 and the second capacitor 125 is coupled to ground.

The buck converter 100 comprises furthermore a third switch 130 coupling an upper node 131 of the second capacitor 125 to the input node 104 of the low-pass filter circuit 105. The input node 104 of the low-pass filter circuit 105 establishes also an input node of the inductor 107 and may be in the following also referred to as input node 104 of the inductor 107. The third switch 130 is embodied as transistor, more particularly as p-MOSFET.

The buck converter 100 is coupled to a load resistor 150. More particularly, the load resistor 150 is arranged between the first output node 103a and the second output node 103b.

The load resistor 150 may correspond to the input resistance of a computerized device that is supplied by the buck converter 100 with the output voltage $V_o$. The resistance of the load resistor 150 may vary over time. A high resistance of the load resistor 150 corresponds to a low load of the buck converter and a low output current $I_L$. A low resistance of the load resistor 150 corresponds to a high load of the buck converter and a high output current $I_L$.

The buck converter 100 comprises furthermore a controller 160. The controller 160 is provided for controlling the buck converter 100. The controller is in particular configured to control the first switch 101, the second switch 124, the low-pass filter switch 110 and the third switch 130. Accordingly the controller 160 is coupled to the first switch 101, the second switch 124, the low-pass filter switch 110 and the third switch 130 and is configured to provide a control signal to the first switch 101, the second switch 124, the low-pass filter switch 110 and the third switch 130. More particularly the controller 160 is configured to provide control signals to the gates of the transistors of the first switch 101, the second switch 124, the low-pass filter switch 110 and the third switch 130.

According to embodiments the controller 160 is configured to provide a control signal $C_1$ to the first switch 101, a control signal $C_2$ to the second switch 124, a control signal $C_4$ to the low-pass filter switch 110 and a control signal $C_3$ to the third switch 130.

The controller 160 is configured to turn on the first switch 101 during an on-cycle. This switches and connects the input voltage $V_o$ to the low-pass filter circuit 105. During a subsequent off-cycle the first switch 101 is turned off, which disconnects the input voltage $V_o$ from the low-pass filter circuit 105.

The controller 160 is configured to continuously switch the first switch 101 on and off. Accordingly the first switch 101 pulses current from the input voltage $V_i$ into the inductor 107 at a chosen frequency. The frequency may be selected dependent on several design parameters, including efficiency and space. According to embodiments the width of the switching pulses, i.e. the length of the pulse during which the first switch 101 is turned on, is regulated in dependence on the load characteristics, i.e. the resistance of the load resistor 150. If the load is very low, the buck converter can even skip some pulses. With such a pulse wide modulation (PWM) the load current $I_L$ can be controlled and adapted to the respective load. The longer the switching pulse, the higher the average output voltage $V_o$ and the higher the corresponding load current $I_L$.

When the load current $I_L$ suddenly changes, the buck converter 100 reacts by regulating its output voltage $V_o$. According to embodiments the load of the buck converter 100 could be a microprocessor. Modern microprocessors running at very high frequency can reduce their current consumption very rapidly from full load to nearly no load, for instance by entering a standby mode.

The controller 160 of the buck converter 100 may react to load reductions by reducing the width of the next pulse or by even skipping it. The most critical point for a load reduction is the moment when the current pulse ends or some time period around this moment, because from this moment it is the longest time period until the controller 160 can react by reducing the width/length of the next pulse or by skipping the next pulse. At this moment however, the output voltage $V_o$ is the highest, the first capacitor 123 is fully charged and the current through the inductor 107 is also highest.

If the load current $I_L$ is reduced in this moment, the energy stored in the inductor 107 will be transferred to the first capacitor 123. This results in an increase of the output voltage Vo. According to embodiments the controller 160 detects this voltage increase during the off-cycle and adds the second capacitor 125 by the second switch 124. This enables a load sharing of the charge in the first capacitor 123 and a parallel absorption of the current through the inductor 107 by the first capacitor 123 and the second capacitor 125.

The controller 160 is configured to turn off the second switch 124 under normal load operations. As a result, the second capacitor 124 is disconnected and will not be charged during normal operation. This provides the advantage that in the moment of a load reduction the second capacitor 124 can absorb much more energy at the same capacitance than the loaded first capacitor 123.

The controller 160 turns on the second switch 124 only in case of a load reduction, and in particular in case of a sudden and significant load reduction during the off-cycle.

Hence by providing the second capacitor 125 embodiments of the inventions avoid output voltage overshoots in case of load drops/load reductions during the off-cycle. In particular, buck converters according to embodiments of the invention may ensure that the buck converters do not exceed a specified supply voltage limit even in case of sudden and strong load drop during the off-cycle.

The energy that is stored by the second capacitor 125 may be conserved and may according to embodiments of the invention fed back to the buck converter 100 and reused by the buck converter 100. This improves the energy efficiency of the buck converter.

According to embodiments the controller 160 is configured to discharge the second capacitor 125 via the third switch 130. This allows feeding back the energy stored in the second capacitor into the converter. For this the third switch 130 connects the upper end of the second capacitor 125 to the input node of the inductor 107.

At which time the second capacitor 125 is discharged may depend on the load characteristics.

According to embodiments the converter 100 is configured to discharge the second capacitor 125 via the third switch 130 when the load increases again after the load reduction. This is a preferred embodiment if the load drop/load reduction lasts only a short time and may provide the advantage that the input current changes less drastically. More particularly, in the moment of a load drop/load reduction, the input current drops slower and it increases slower when the load returns, because some of the extra energy needed comes from the second capacitor 125.

According to embodiments the controller 160 is configured to discharge the second capacitor 125 after a predetermined time via the third switch 130 if the load reduction lasts longer than the predetermined time. This is a preferred embodiment if the load is only reduced or strongly reduced. This avoids a discharge by parasitic resistors if the load drop lasts longer.

According to embodiments the controller 160 is configured to discharge the second capacitor 125 via the third switch 130 when the first capacitor 123 reaches a steady-state operation voltage. Such a steady-state operation voltage is characterized by a constant pulse width/pulse length and a corresponding constant or substantially constant load characteristic. This is a preferred embodiment if the load is only strongly reduced. This avoids a discharge by parasitic resistors if the load drop lasts longer.

However, if the load vanishes entirely (infinite load resistance) for a longer time period and no output current flows, the discharge by parasitic resistors is unavoidable.

According to embodiments the controller 160 is configured to detect a load reduction during the off-cycle by detecting a rising output voltage during the off-cycle. Under normal and in particular constant load operations the output voltage $V_o$ decreases during the off-cycle. If the output voltage $V_o$ increases during the off-cycle, this is an indication that the load has been reduced during the off-cycle. The controller 160 may detect this load increase by monitoring and measuring the output voltage with measurement circuits well known in the art.

One advantage of a buck converter according to embodiments of the invention is a reduction in size of the first capacitor compared with conventional designs. The total capacitance of the first and the second capacitor can be much smaller than the output capacitor that would be needed in a conventional design with only one output capacitor, in particular when the maximum output voltage is very close to the required output voltage for normal operation.

According to embodiments the controller 160 is able to react very fast. As an example the switching frequency may be embodied in a range of up to 2 MHz for a discrete implementation.

The space needed for the second and the third transistor is typically much smaller than the design space needed for a large single capacitor.

Another advantage of embodiments of the invention is a high efficiency if the load changes frequently as the excess energy can be stored in the second capacitor 125 and used in later cycles.

Figure 2:
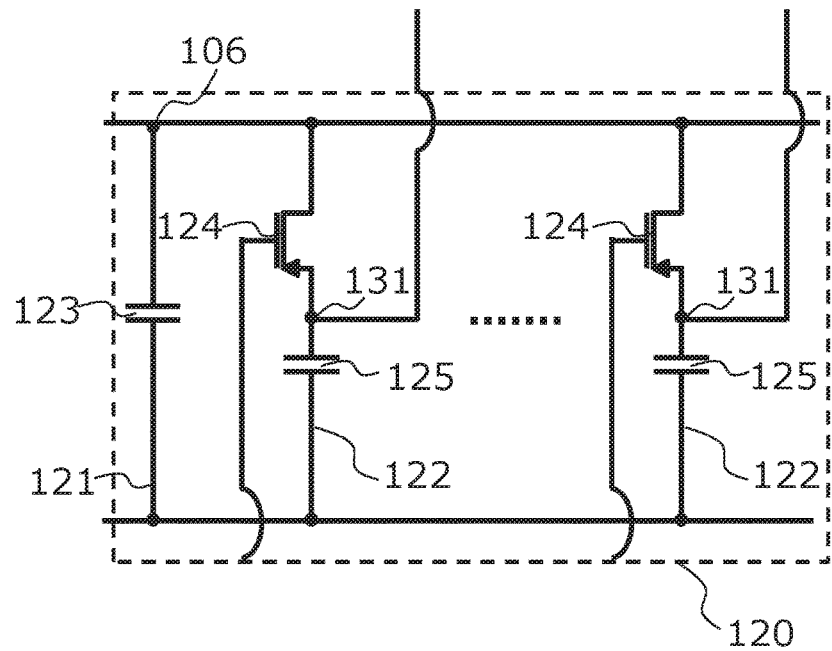
FIG. 2 shows an output capacitor system of a buck converter comprising a plurality of second paths.

FIG. 2 shows an output capacitor system 120 comprising a plurality of second paths 122. Each of the plurality of the second paths 122 comprises a serial connection of a second switch 124 and a second capacitor 125.

The controller 160 may be configured to activate selectively one or more of the plurality of the second paths 122 in dependence on the magnitude of a load reduction during the off-cycle. If there is e.g. a relatively low load reduction, only one of the second paths 122 may be added by switching on the corresponding second switch 124, thereby adding one second capacitor 125. If there is e.g. a high load reduction, all of the second paths 122 may be added by switching all of the corresponding second switches 124, thereby adding all of the second capacitors 125.

Figure 3:
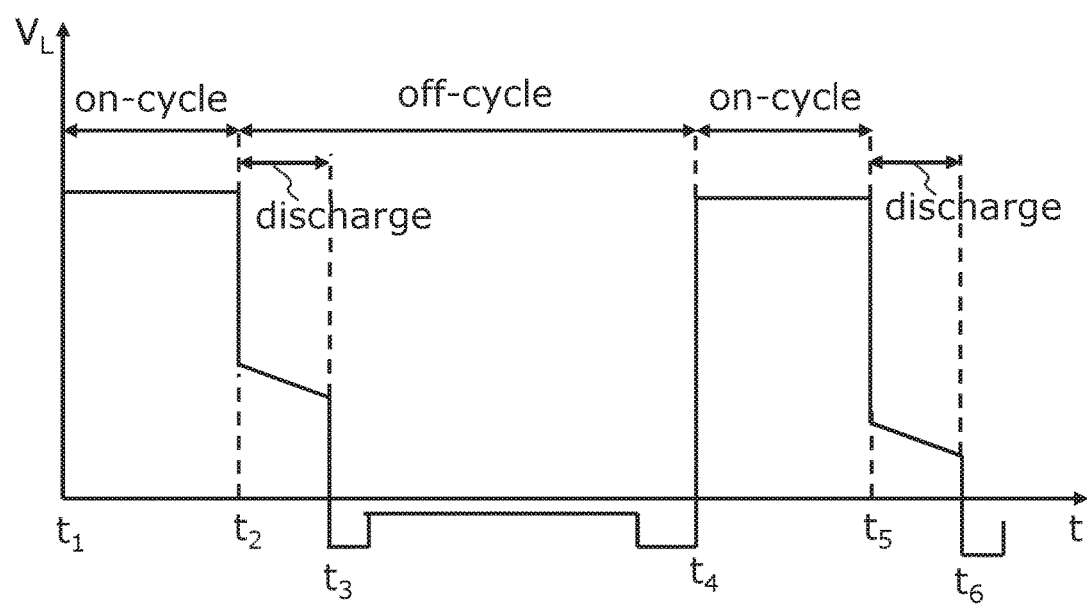
FIG. 3 illustrates a timing diagram of a voltage at a low-pass filter input node of a buck converter.

FIG. 3 illustrates a timing diagram 300 of the voltage $V_L$ at the low-pass filter input node 104. More particularly, the timing diagram 300 illustrates a preferred way of discharging the second capacitor 125 after the second capacitor 125 was charged during an off-cycle load drop.

Accordingly it is assumed that at a point in time $t_1$ the second capacitor 125 is charged and the load has increased again after the previous off-cycle load reduction during which the second capacitor 125 was charged. At the point in time $t_1$ the on-cycle starts and accordingly the first switch 101 is turned on and the input voltage $V_i$ is switched to the low-pass filter circuit input node 104. At time $t_2$ the on-cycle ends and the off-cycle starts and accordingly the first switch 101 is turned off. Simultaneously, at time $t_2$ the third switch 130 is turned on by the controller 160 and the second capacitor 125 is discharged. Hence the voltage $V_L$ does not drop completely, but decreases slowly with a decreasing slope. At a point in time $t_3$ the third switch 130 is turned off and the discharging of the second capacitor 125 stops for the time being.

At a point in time $t_4$ another on-cycle starts and accordingly the first switch 101 is turned on and the input voltage $V_i$ is switched to the low-pass filter circuit input node 104. At a point in time $t_5$ the on-cycle ends and the off-cycle starts and accordingly the first switch 101 is turned off. Simultaneously, at the point in time $t_5$ the third switch 130 is turned on by the controller 160 and the second capacitor 125 proceeds with discharging. In this example it is assumed that the discharging of the second capacitor 125 takes several cycles and accordingly the voltage $V_L$ at the low-pass filter input node 104 during the discharging cycle starts at a lower level. Subsequently the voltage $V_L$ decreases slowly with a decreasing slope. At a point in time $t_6$ the third switch 130 is turned off and the discharging of the second capacitor 125 stops for the time being. The discharging may be continued in subsequent cycles until the second capacitor 125 has been discharged completely.

According to another embodiment the second capacitor 125 could be discharged completely during one single off-cycle.

By discharging the second capacitor 125 during the off-cycles the corresponding electrical energy is fed back to the buck converter 100. This increases the energy efficiency of the bock converter 100.

It should be noted that the timing diagram 300 is not drawn to scale.

Figure 4:
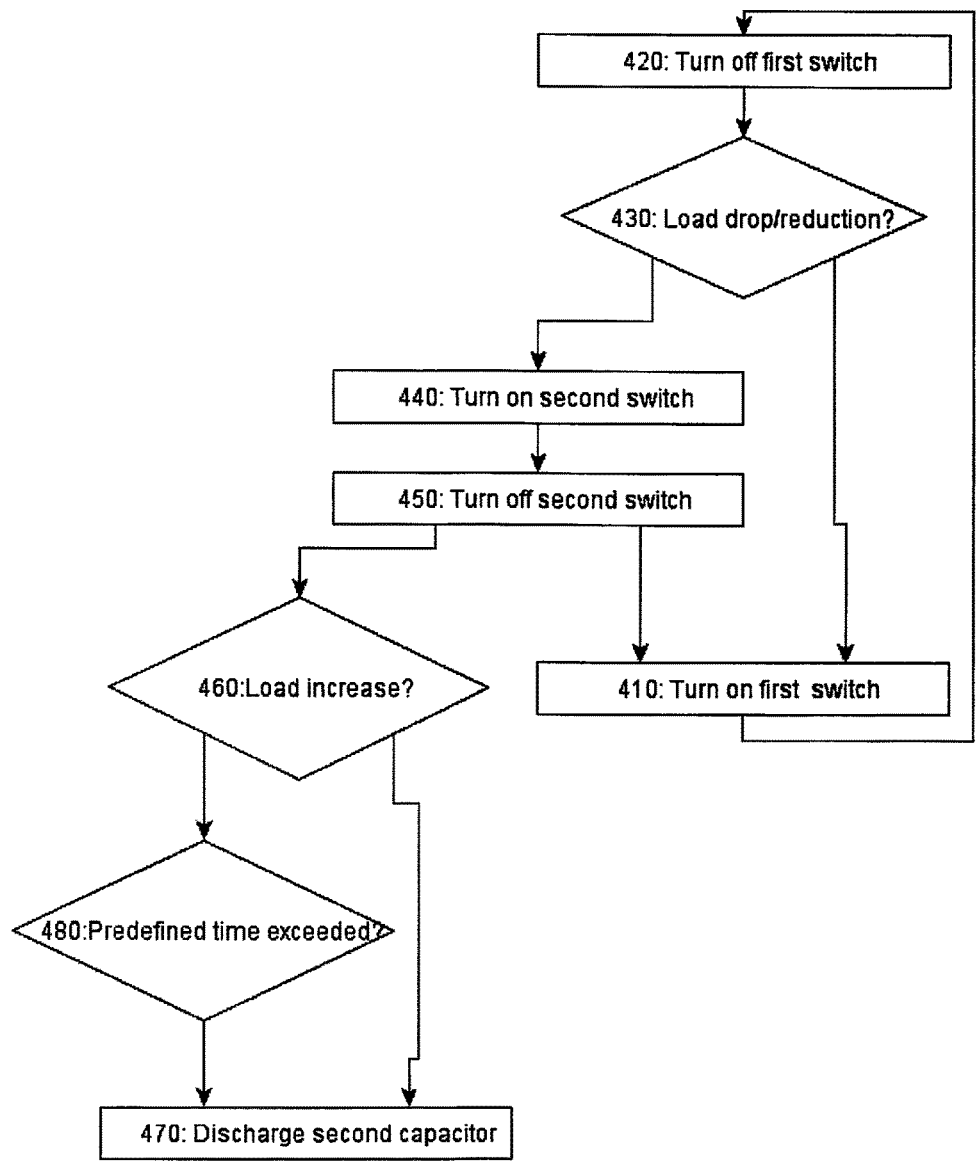
FIG. 4 shows a flow chart of a method for controlling a buck converter according to an embodiment of the invention.

FIG. 4 shows a flowchart of steps of a method for handlings load reductions/load drops in a buck converter according to embodiments of the invention. The buck converter may be embodied as the buck converter 100 as described with reference to FIG. 1.

At a step 410, the controller 160 turns on the first switch 101. This starts the on-cycle. As a result, the input voltage is switched to the low-pass filter circuit 105.

At a step 420, the controller 160 turns off the first switch 101. This starts the off-cycle.

At a step 430 during the off-cycle, the controller 160 continuously observes whether there is a load drop/load reduction. In case of a load reduction during the off-cycle the second switch 124 is turned on at a step 440 so that the second capacitor 125 is added to the output capacitor system 120. As a result, the charge in the first capacitor 123 is shared and the inductor current is absorbed in parallel by the first capacitor 123 and the second capacitor 125.

At a step 450 the second switch 124 is turned off.

At a step 460 the controller 160 observes whether there is again a load increase after the load drop.

If this is the case, the controller 160 discharges the second capacitor 125 at a step 470 via the third switch 130.

If there is no load increase, the controller 160 monitors at a step 480 whether a predefined time period has exceeded. If the predefined time period has exceeded, the controller 160 discharges the second capacitor via the third switch 130 at a step 470 as well.

Figure 5:
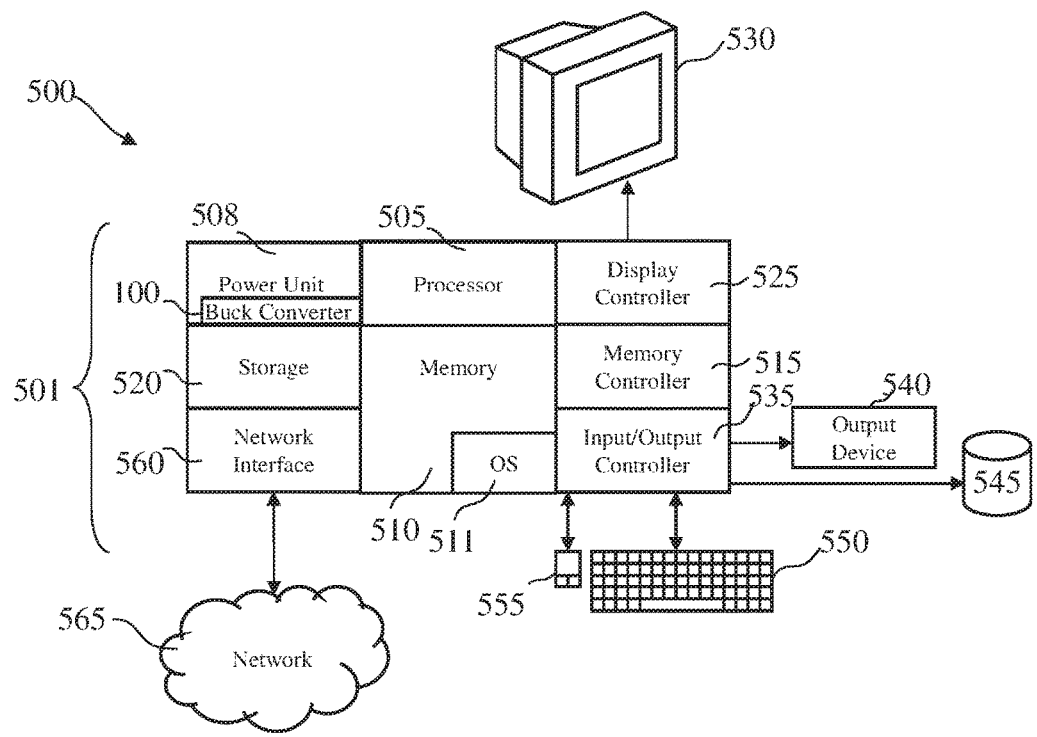
FIG. 5 shows a system comprising a computerized device and a buck converter configured to provide a regulated voltage to the computerized device.

FIG. 5 shows a schematic block diagram of system 500 comprising a buck converter 100 and a computerized device 501.

In exemplary embodiments, methods described herein may be implemented in software or firmware as an executable program, the latter executed by the controller 160 of the buck converter 100 and/or a processor 505.

For instance, the system 500 depicted in FIG. 5 schematically represents the computerized device 501, e.g., a general-purpose computer. In exemplary embodiments, in terms of hardware architecture, as shown in FIG. 5, the computerized device 501 includes the processor 505, memory 510 coupled to a memory controller 515, and one or more input and/or output (I/O) devices 540, 545, 550, 555 (or peripherals) that are communicatively coupled via a local input/output controller 535. The input/output controller 535 can be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The computerized device 501 comprises furthermore a power unit 508 adapted to supply the various components of the computerized device 501 with electrical power. The power unit 501 comprises one or more buck converters 100 that are adapted to supply e.g. the processor 505 and/or other components of the computerized device 501 with a controlled supply voltage. The computerized device 501 may be configured to inform the controller 160 of the buck converter 100 about expected load drops such that the controller 160 can turn on the second switch 124. In addition, the computerized device 501 may be configured to inform the controller 160 about the expected duration of the expected load drop.

The processor 505 is a hardware device for executing software, particularly that stored in memory 510. The processor 505 can be any custom made or commercially available processor, a central processing unit (CPU), an auxiliary processor among several processors associated with the computerized device 501, a semiconductor based microprocessor (in the form of a microchip or chip set), or generally any device for executing software instructions.

The memory 510 can include any one or combination of volatile memory elements (e.g., random access memory) and nonvolatile memory elements. Moreover, the memory 510 may incorporate electronic, magnetic, optical, and/or other types of storage media. Note that the memory 510 can have a distributed architecture, where various components are situated remote from one another, but can be accessed by the processor 505.

The software in memory 510 may include one or more separate programs, each of which comprises an ordered listing of executable instructions for implementing logical functions. In the example of FIG. 5, the software in the memory 510 may include methods described herein in accordance with exemplary embodiments and a suitable operating system (OS) 511. The OS 511 may control the execution of other computer programs, such as methods as described herein, and provides scheduling, input-output control, file and data management, memory management, and communication control and related services.

Some methods described herein may be in the form of a source program, executable program (object code), script, or any other entity comprising a set of instructions to be performed. When in a source program form, then the program needs to be translated via a compiler, assembler, interpreter, or the like, as known per se.

Possibly, a conventional keyboard 550 and mouse 555 can be coupled to the input/output controller 535 (in particular for the BS, if needed).

The system 500 can further include a display controller 525 coupled to a display 540. In exemplary embodiments, the system 500 can further include a network interface or transceiver 560 for coupling to a network 565.

The network 565 transmits and receives data between the computerized device 501 and external systems.

When the computerized device 501 is in operation, the processor 505 is configured to execute software stored within the memory 510, to communicate data to and from the memory 510, and to generally control operations of the computerized device 501 pursuant to the software. Methods described herein and the OS 511, in whole or in part are read by the processor 505, typically buffered within the processor 505, and then executed. When embodied methods as described herein are implemented in software, the methods can be stored on any computer readable medium, such as storage 520, for use by or in connection with any computer related system or method.

According to embodiments the processor load of the processor 505 is controlled by the operating system 511. According to embodiments the system software is configured to provide load information, in particular load reduction information about an expected load drop to the controller 160 of the buck converter 100. This allows proactively activating the second switch 124.

According to a further embodiment the system software could inform the controller 160 about the expected duration of the low-load phase. This facilitates the selection of the right discharge moment.

Figure 6:
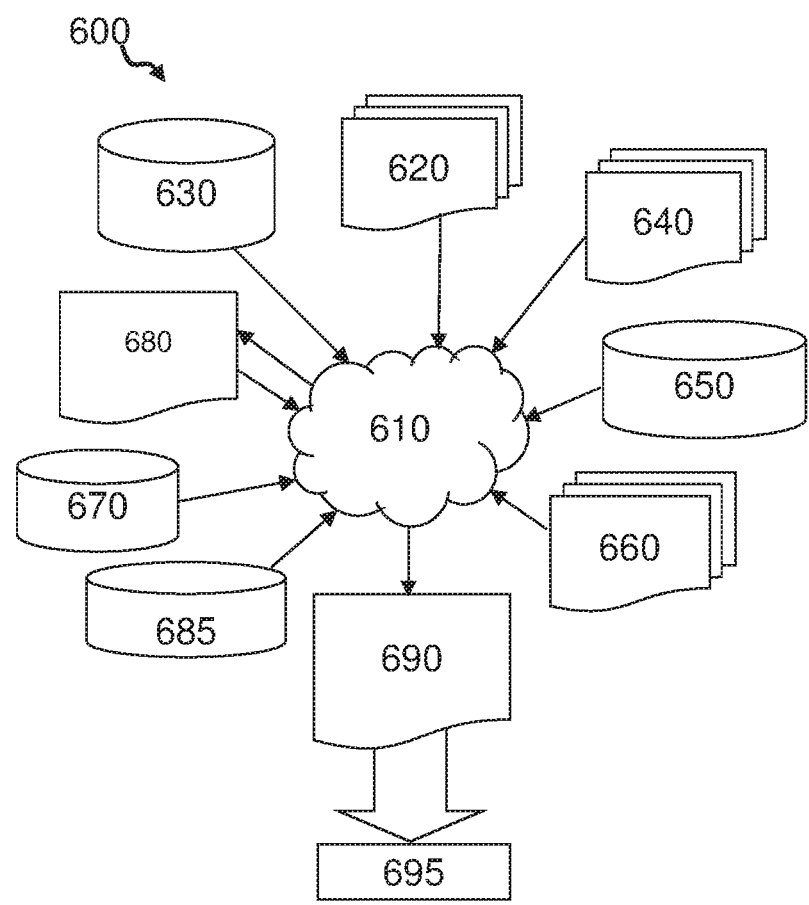
FIG. 6 shows a block diagram of an exemplary design flow used for example, in semiconductor IC logic design, simulation, test, layout, and manufacture.

FIG. 6 shows a block diagram of an exemplary design flow 600 used for example, in semiconductor IC logic design, simulation, test, layout, and manufacture. Design flow 600 includes processes, machines and/or mechanisms for processing design structures or devices to generate logically or otherwise functionally equivalent representations of the design structures and/or devices described above and shown e.g. in FIGS. 1, 2 and 5. The design structures processed and/or generated by design flow 600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 600 may vary depending on the type of representation being designed. For example, a design flow 600 for building an application specific IC (ASIC) may differ from a design flow 600 for designing a standard component or from a design flow 600 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 620 that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD) such as implemented by a core developer/designer. When encoded on a machine-readable data transmission, gate array, or storage medium, design structure 620 may be accessed and processed by one or more hardware and/or software modules within design process 610 to simulate or otherwise functionally represent an electronic component, circuit, electronic or logic module, apparatus, device, or system such as those shown in FIGS. 1, 2 and 5. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown in FIGS. 1, 2 and 5 to generate a Netlist 680 which may contain design structures such as design structure 620. Netlist 680 may comprise, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which netlist 680 is resynthesized one or more times depending on design specifications and parameters for the device. As with other design structure types described herein, netlist 680 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 610 may include hardware and software modules for processing a variety of input data structure types including Netlist 680. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 685 which may include input test patterns, output test results, and other testing information. Design process 610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 610 without deviating from the scope and spirit of the invention. Design process 610 may also include modules for performing standard circuit design processes such as timing analysis, verification, design rule checking, place and route operations, etc.

Design process 610 employs and incorporates logic and physical design tools such as HDL compilers and simulation model build tools to process design structure 620 together with some or all of the depicted supporting data structures along with any additional mechanical design or data (if applicable), to generate a second design structure 690. Design structure 690 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1, 2 and 5. In one embodiment, design structure 690 may comprise a compiled, executable HDL simulation model that functionally simulates the devices shown in FIGS. 1, 2 and 5.

Design structure 690 may also employ a data format used for the exchange of layout data of integrated circuits and/or symbolic data format (e.g. information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1, 2 and 5. Design structure 690 may then proceed to a stage 695 where, for example, design structure 690: proceeds to tape-out, is released to manufacturing, is released to a mask house, is sent to another design house, is sent back to the customer, etc.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A buck converter for converting an input voltage into an output voltage, the buck converter comprising:
   a first switch;
   a low-pass filter circuit comprising
      an inductor;
      a low-pass filter switching device;
      an output capacitor system comprising a parallel arrangement of a first path and at least a second path, the first path comprising a first capacitor and the second path comprising a serial connection of a second capacitor and a second switch;
   a controller for controlling the buck converter;
   wherein
      the controller is configured to:
         turn on the first switch during an on-cycle, thereby switching the input voltage to the low-pass filter circuit;
         turn off the first switch during an off-cycle;
         turn off the second switch under normal load operations so that the second capacitor is not charged;
         turn on the second switch in case of a load reduction during the off-cycle so that the second capacitor is added to the output capacitor system by the second switch, thereby enabling a load sharing of a charge in the first capacitor and a parallel absorption of an inductor current by the first and the second capacitor; and
      a third switch coupling an upper node of the second capacitor to an input node of the inductor,
   wherein the controller is configured to one of: discharge the second capacitor via the third switch, or discharge the second capacitor via the third switch when the load increases again after the load reduction.

2. The converter according to claim 1, wherein the controller is configured to detect the load reduction during the off-cycle by detecting a rising output voltage during the off-cycle.

3. The converter according to claim 1, wherein the controller is configured to discharge the second capacitor after a predetermined time via the third switch if the load reduction lasts longer than the predetermined time.

4. The converter according to claim 1, wherein the controller is configured to discharge the second capacitor via the third switch when the first capacitor reaches a steady-state operation voltage.

5. The converter according to claim 1, wherein the output capacitor system comprises a plurality of second paths, wherein each of the plurality of the second paths comprises a serial connection of a second capacitor and a second switch.

6. The converter according to claim 5, wherein the controller is configured to activate selectively one or more of the plurality of the second paths in dependence on the magnitude of the load reduction during the off-cycle.

7. The converter according to claim 1, wherein the low-pass filter switching device comprises a diode.

8. The converter according to claim 1, wherein the low-pass filter switching device comprises a low-pass filter switch.

9. The converter according to claim 1, wherein the low-pass filter switching device comprises a parallel arrangement of a diode and a low-pass filter switch.

10. A system comprising a buck converter for converting an input voltage into an output voltage and a computerized device, the buck converter comprising:
   a first switch;
   a low-pass filter circuit comprising
      an inductor;
      a low-pass filter switching device;
      an output capacitor system comprising a parallel arrangement of a first path and at least a second path, the first path comprising a first capacitor and the second path comprising a serial connection of a second capacitor and a second switch;
   a controller for controlling the buck converter;
   wherein
      the controller is configured to:
         turn on the first switch during an on-cycle, thereby switching the input voltage to the low-pass filter circuit;

turn off the first switch during an off-cycle;
turn off the second switch under normal load operations so that the second capacitor is not charged;
turn on the second switch in case of a load reduction during the off-cycle so that the second capacitor is added to the output capacitor system by the second switch, thereby enabling a load sharing of a charge in the first capacitor and a parallel absorption of an inductor current by the first and the second capacitor; and
a third switch coupling an upper node of the second capacitor to an input node of the inductor;
wherein the controller is configured to one of: discharge the second capacitor via the third switch, or discharge the second capacitor via the third switch when the load increases again after the load reduction; and said buck converter being configured to provide the output voltage to the computerized device and the computerized device being configured to inform the controller about an expected load drop such that the controller can turn on the second switch.

11. The system according to claim 10, wherein the computerized device is configured to inform the controller about the expected duration of the expected load drop.

12. The system as claimed in claim 11, wherein the computerized device is one of: a router; a switch; a computer; a mobile device and a FPGA.

13. A method for handling load reductions in a buck converter, the buck converter being configured to convert an input voltage into an output voltage, the buck converter comprising:
a first switch;
a low-pass filter circuit comprising
an inductor;
a low-pass filter switching device;
an output capacitor system comprising a parallel arrangement of a first path and at least a second path, the first path comprising a first capacitor and the second path comprising a serial connection of a second capacitor and a second switch;
a controller for controlling the buck converter;
the method comprising
turning on the first switch during an on-cycle, thereby switching the input voltage to the low-pass filter circuit;
turning off the first switch during an off-cycle;
turning off the second switch under normal load operations so that the second capacitor is not charged;
turning on the second switch in case of a load reduction during the off-cycle so that the second capacitor is added to the output capacitor system, thereby enabling a load sharing of a charge in the first capacitor and a parallel absorption of an inductor current by the first and the second capacitor; and
discharging, by the controller, the second capacitor via a third switch, wherein the third switch is provided for coupling an upper node of the second capacitor to an input node of the inductor.

14. The method according to claim 13, further comprising:
detecting, by the controller, the load reduction during the off-cycle by detecting a rising output voltage during the off-cycle.

15. The method according to claim 13, further comprising:
providing, by the converter, the output voltage to a computerized device;
providing, by the computerized device, load reduction information about an expected load reduction to the controller;
activating, by the controller, the second switch based on the load reduction information.

16. A design structure tangibly embodied in a machine readable medium for designing, manufacturing, or testing an integrated circuit, the design structure comprising:
a buck converter configured to convert an input voltage into an output voltage, the buck converter comprising:
a first switch;
a low-pass filter circuit comprising
an inductor;
a low-pass filter switching device;
an output capacitor system comprising a parallel arrangement of a first path and at least a second path, the first path comprising a first capacitor and the second path comprising a serial connection of a second capacitor and a second switch;
a controller for controlling the buck converter;
wherein
the controller is configured to
turn on the first switch during an on-cycle, thereby switching the input voltage to the low-pass filter circuit;
turn off the first switch during an off-cycle;
turn off the second switch under normal load operations so that the second capacitor is not charged;
turn on the second switch in case of a load reduction during the off-cycle so that the second capacitor is added to the output capacitor system by the second switch, thereby enabling a load sharing of a charge in the first capacitor and a parallel absorption of an inductor current by the first and the second capacitor; and
a third switch coupling an upper node of the second capacitor to an input node of the inductor,
wherein the controller is configured to one of: discharge the second capacitor via the third switch, or discharge the second capacitor via the third switch when the load increases again after the load reduction.

17. The design structure according to claim 16, wherein the design structure resides on storage medium as a data format used for the exchange of layout data of integrated circuits.

* * * * *